United States Patent [19]

Matsumoto

[11] Patent Number: 5,780,989
[45] Date of Patent: Jul. 14, 1998

[54] METHOD AND APPARATUS FOR AC SERVO MOTOR CONTROL

[75] Inventor: Kaname Matsumoto, Yamanashi, Japan

[73] Assignee: Fanuc, Ltd., Yamanashi, Japan

[21] Appl. No.: 889,045

[22] Filed: Jul. 7, 1997

Related U.S. Application Data

[63] Continuation of Ser. No. 505,534, Jul. 21, 1995, abandoned.

[30] Foreign Application Priority Data

Aug. 4, 1994 [JP] Japan ................................. 6-201551

[51] Int. Cl.$^6$ ................................. G05D 23/275
[52] U.S. Cl. .................. 318/632; 318/568.22; 318/606; 318/798; 318/807
[58] Field of Search .................. 341/118; 318/632, 318/560, 561, 563, 565, 567–569, 600–608, 727–832

[56] References Cited

U.S. PATENT DOCUMENTS 3,705,400   12/1972   Cordes ........................ 340/347 R
4,458,322   7/1984   Veale ........................... 318/632
5,293,102   3/1994   Martinon et al. ................ 318/663
5,319,294   6/1994   Ohto et al. .................... 318/632 X

*Primary Examiner*—David S. Martin
*Attorney, Agent, or Firm*—Staas & Halsey

[57] ABSTRACT

The present invention relates to an AC servo motor control is disclosed, in which a voltage command is produced from the deviation between a current command and feedback current for the AC servo motor control according to the voltage command thus produced. Whenever the voltage command becomes zero, feedback-current data is collected for a predetermined period of time. Offset amount is calculated for updating according to the collected feedback-current data. Subsequently, the feedback current is corrected by using the new offset amplitude during revolution of the AC servo motor. A voltage command to the AC servo motor is produced according to the deviation between the current command and the compensated feedback current.

8 Claims, 8 Drawing Sheets

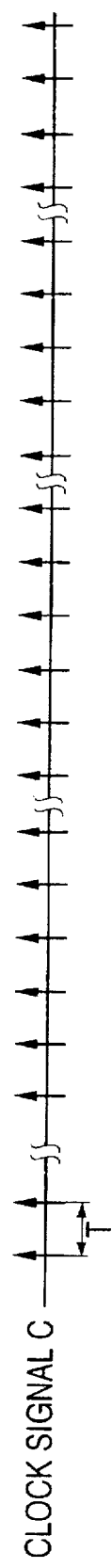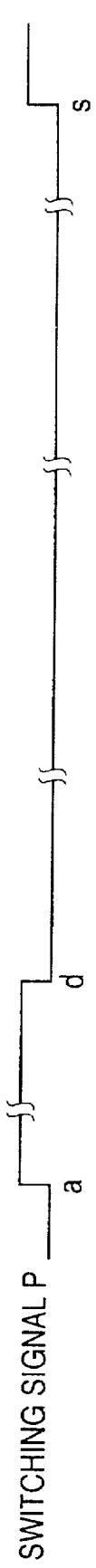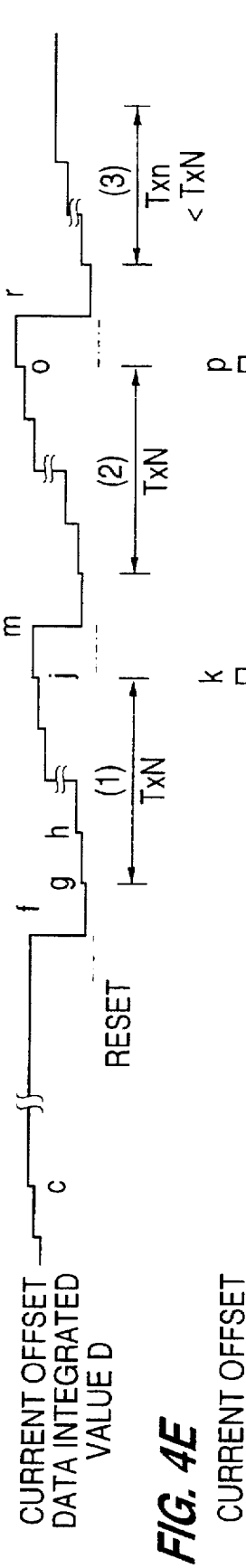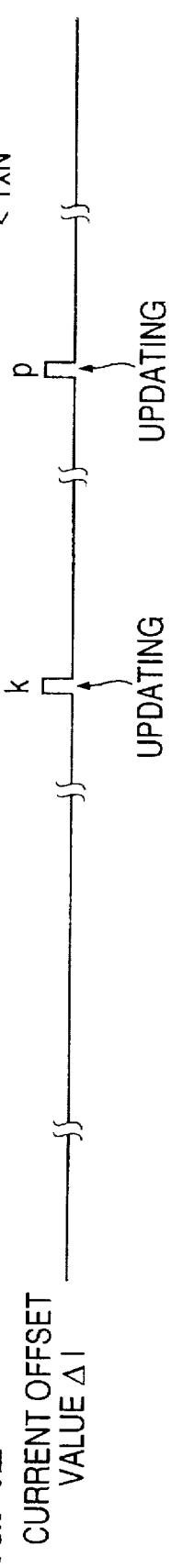
FIG. 4A CLOCK SIGNAL C
FIG. 4B SWITCHING SIGNAL P
FIG. 4C OFFSET DATA TAKE-IN SIGNAL Q
FIG. 4D CURRENT OFFSET DATA INTEGRATED VALUE D
FIG. 4E CURRENT OFFSET VALUE ΔI

METHOD AND APPARATUS FOR AC SERVO MOTOR CONTROL

This application is a continuation of application Ser. No. 08/505,534, filed on Jul. 21, 1995, now abandoned.

BACKGROUND OF THE INVENTION

1. Field of the Invention

This invention relates to an AC servo motor control in which actual motor current is controlled to be equal to command current through feedback control, and further, a feedback amount to be inputted to a current loop is corrected accurately for removing an offset component induced by hardware elements comprised in the current loop so that irregular revolution of the servo motor may be suppressed.

2. Description of the Related Art

AC servo motors and like AC motors are used for driving feed shafts of a machine tool, robot arms or the like. A current controller of a three-phase AC servo motor is shown in the block diagram of FIG. 9. Referring to FIG. 9, reference numeral 1 is a phase compensating circuit, and 2R, 2S and 2T are R, S and T-phase current loops. In the individual phase current loops, current control is made as IP (integral plus proportional control). Reference numeral 3 is an integral element of the current loop, with K1 being an integral gain. Reference numeral 4 is a proportional element, with K2 being a proportional gain. Reference numeral 5 is a term of transfer function of a motor, with R being coil resistance and L being coil inductance. In FIG. 9, only an R-phase current loop is shown in detail. The other, i.e., S and T-phase current loops are the same as the R-phase current loop and are not shown in detail.

In response to a current command Ic outputted from a speed loop or the like, the phase compensating circuit 1 derives individual phase commands IR, IS and IT from an electric angular position α of a rotor and a speed feedback value fv at a motor.

More specifically, according to the speed of the motor, a phase lead (angle)β is added to an electric angular position α of the rotor, and then current command Ic is multiplied by three sinusoidal wave signals, sin (ωt+α+β), sin (ωt+α+β+2π/3) and sin (ωt+α+β+4π/3), to output currents for each phase.

Now, the operation of the current loop will be described with reference to R-phase. From the R-phase current command IR, a feedback value fR1 of the actual R-phase current detected by current detector or the like is subtracted to obtain a current deviation. The current deviation is integrated, and the resultant integrated value is multiplied by the integral gain K1 (element 3). From the value thus obtained, the product of the feedback value fR1 and the proportional gain K2 (element 3) is subtracted to derive PWM (pulse width modulation) command, which is used for a PWM processing to drive the motor. The same may be said of the S and T-phase current loop processings.

The control in each phase current loop is made to make the detected actual current as the feedback value equal to the current command. The actual current in the motor is fed back to the current loop after passing through a current detection system such as a current/voltage converter and an A/D converter. However, the fed-back current may contain an offset component, which is introduced in the current detection system. This is so because the current detection system generates offset. This offset is irrelevant to the motor operation. When the motor is in a stationary state (with zero actual current), the sole offset component is provided from the current detection system.

The offset is added as noise to the feedback current to be delivered to the current loop. As a result, a pulsation component varying in dependence on the electric angle is generated in the motor torque, that is, one cycle torque ripple is generated in each rotation of electric angle. Accordingly, in the prior art:

(1) a value outputted from the current detection system, when no current flows through the motor while a power supply to the motor is held on, is determined to be an offset value, and (2) at the time of the current control, the difference of the offset value from the detected actual current value is fed back as feedback current.

Generally, the current/voltage converter, A/D converter or like electronic components used in the current detection system has a temperature-dependent characteristic, and the offset is varied (i.e., a drift is generated) with temperature. FIG. 10 shows a process of the gradual increase of the current offset from $O_1$ at the time of start of the AC servo motor. This increase of offset results from gradual increase of temperature in various parts with the lapse of operation time.

Hitherto, as described above, the magnitude of offset has been determined from the value of current fed back to the current command side at the start of power supply to an AC servo motor (that is, the magnitude of offset has been fixed to $O_1$ in FIG. 10). In other words, no accurate compensation of feedback current has been made to cope with the offset drift caused by changes in hardware with temperature.

OBJECT AND SUMMARY OF THE INVENTION

An object of the invention is to suppress generation of irregular revolution (irregular feed) of an AC servo motor, even though characteristics of the components in a current detection system may change, by performing feedback processing in which an accurate compensation is always realized based on the proper offset value, coping with fluctuation of offset value caused by the change of characteristics of such components.

According to the control method of the present invention, the feedback current is corrected so as to remove the offset component introduced by the current detection system during the revolution of a motor. More specifically, whenever a voltage command to the AC servo motor becomes zero with a power supply connected to the motor, the value of feedback to the current loop is detected, and the offset value is determined and updated according to the detected feedback value.

Particularly, according to the present invention, whenever the voltage command to the AC servo motor becomes zero while the power supply to the motor is held on, the value of feedback to the current loop is detected for a plurality of continuous process cycles, and the mean value of the detected offset data is determined as an offset value.

According to the present invention, since the offset value for compensating the feedback current is continuously updated according to continuously detected data as shown above, it is possible to realize accurate current feedback at all times during the revolution of the motor regardless of a change in hardware characteristics with the lapse of time, so that it is possible to provide an adequate voltage command to the servo motor at all times.

BRIEF DESCRIPTION OF THE DRAWINGS

The foregoing and other objects and features of the invention will become apparent from the following detailed

Figure 1:
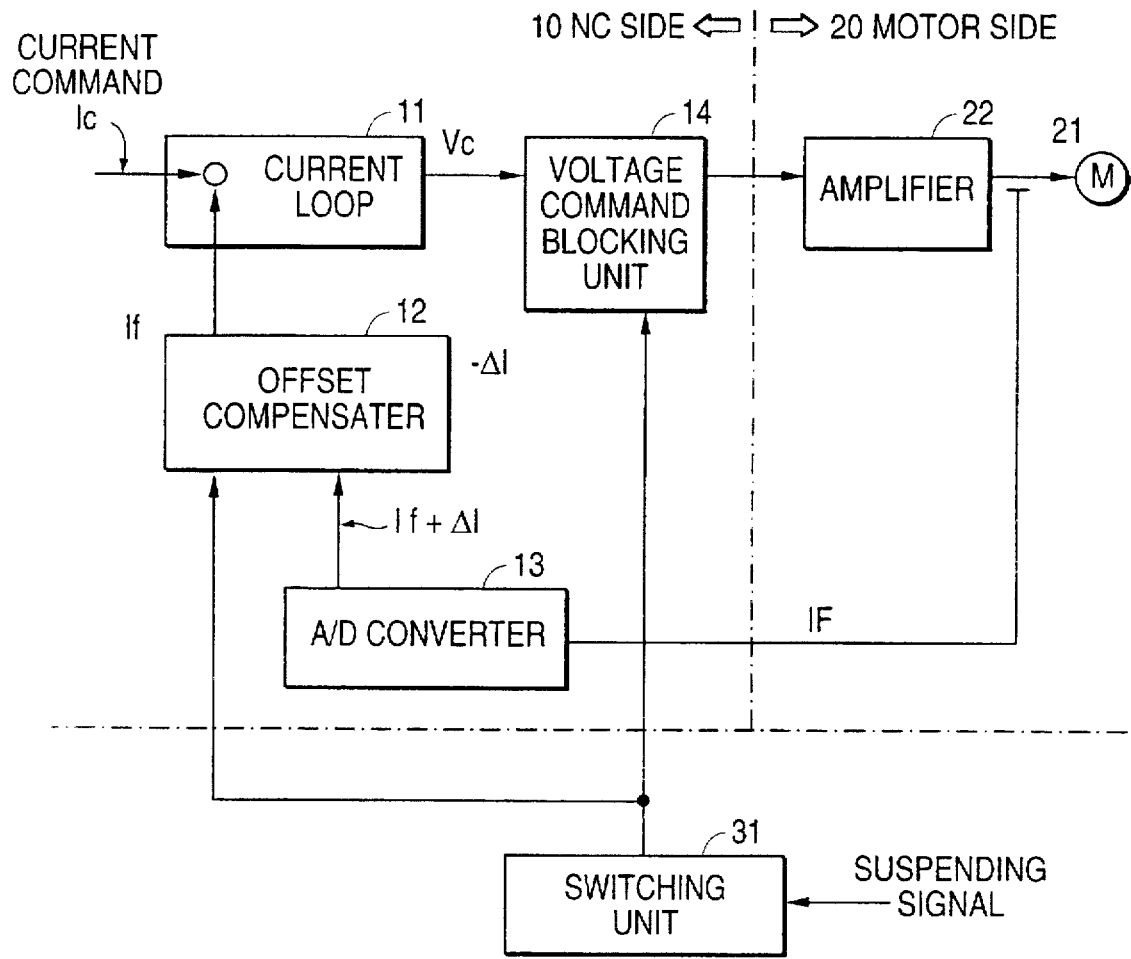
Figure 2:
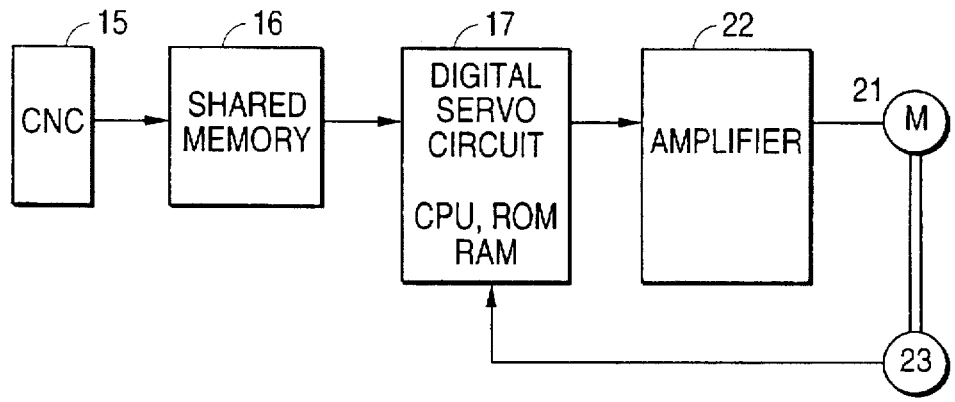
Figure 3:
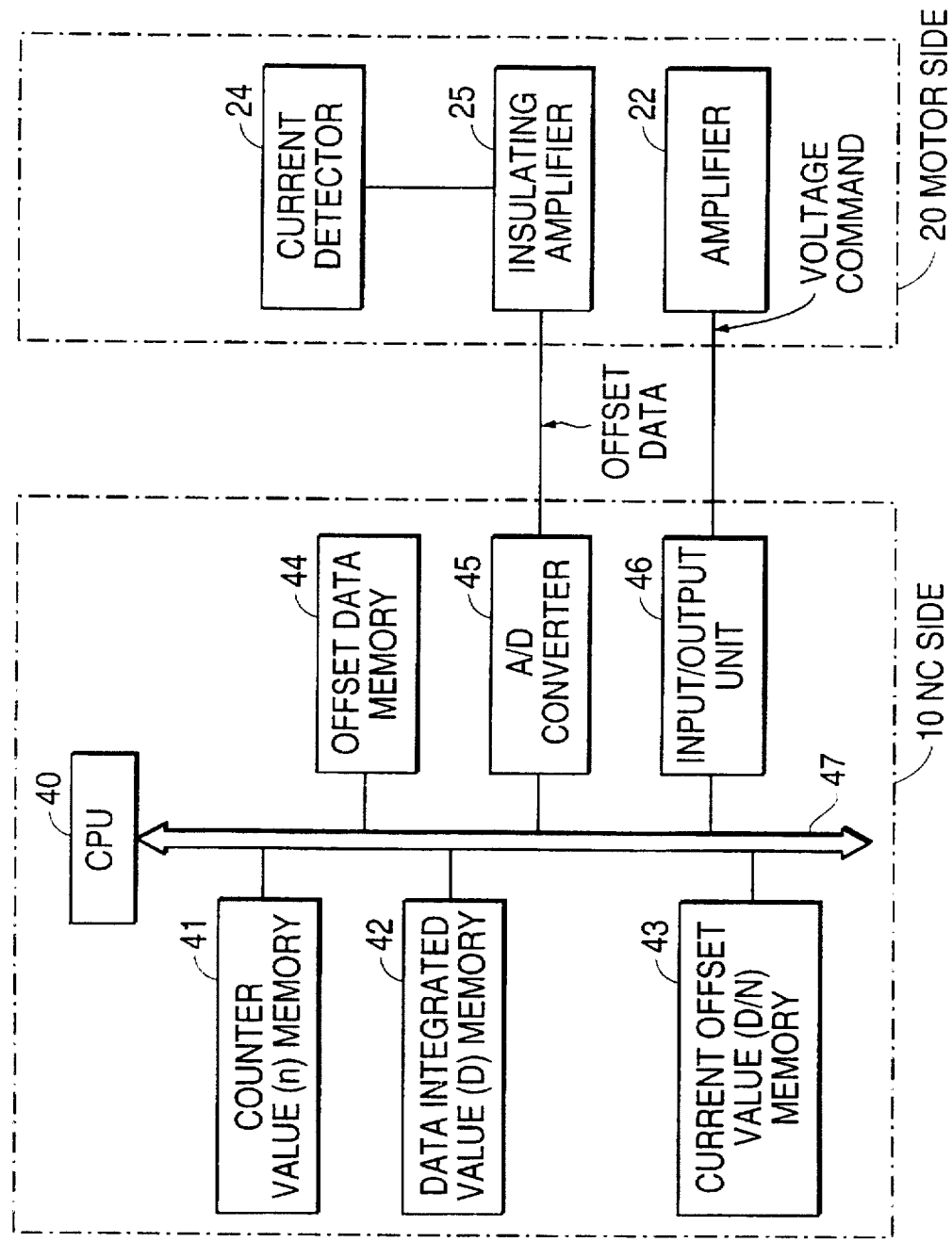
Figure 5:
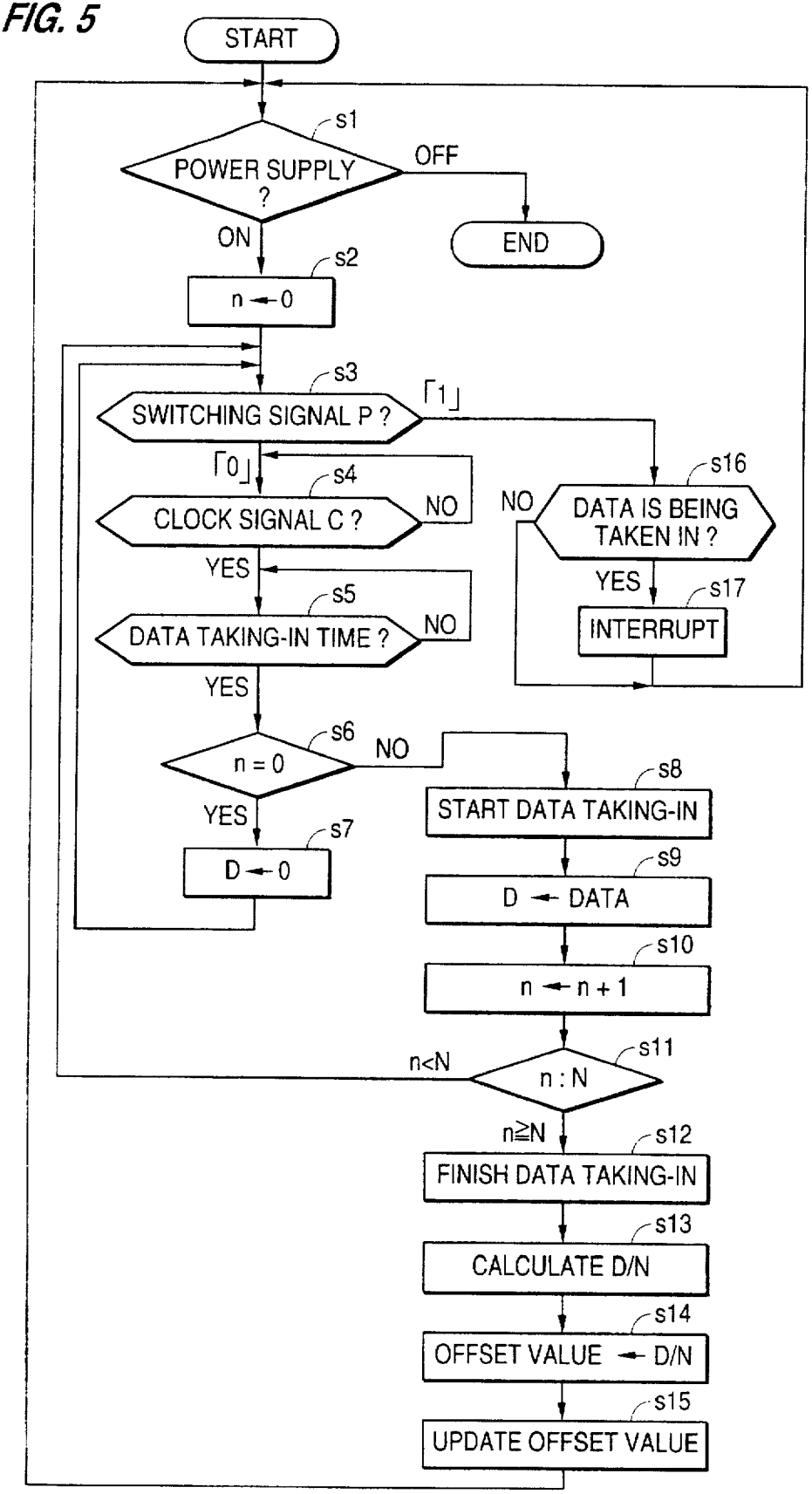
Figure 6:
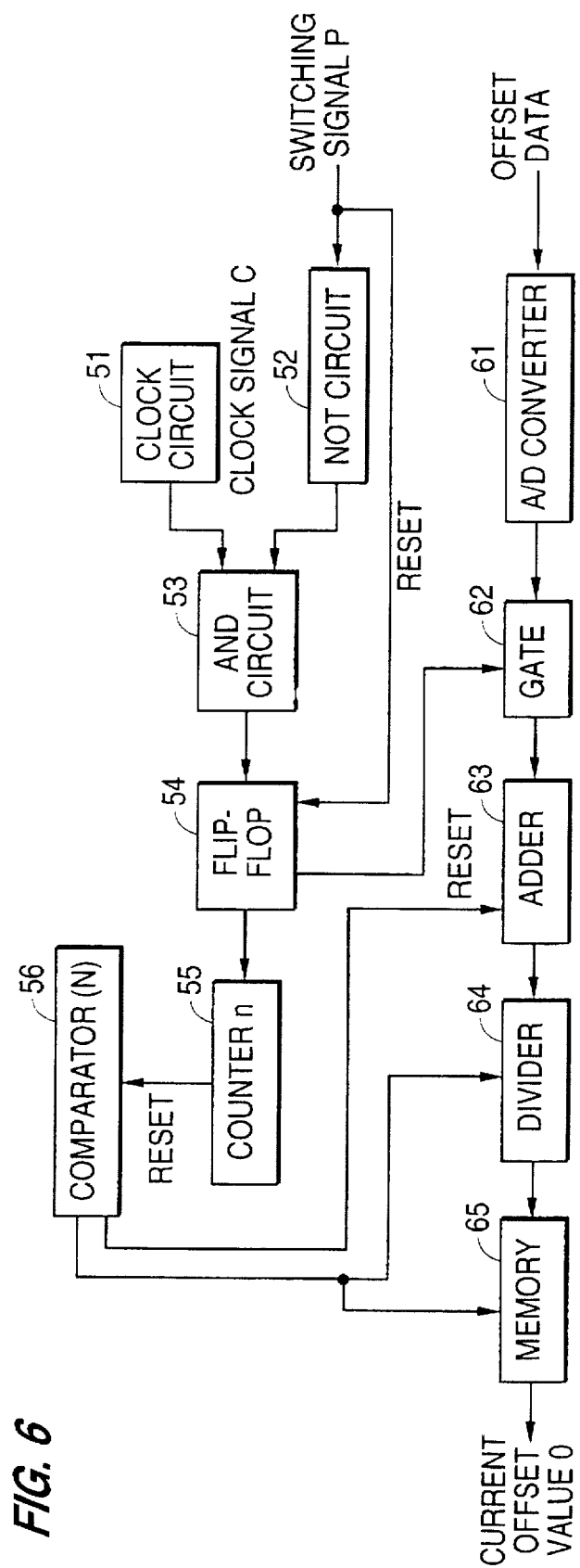
Figure 7:
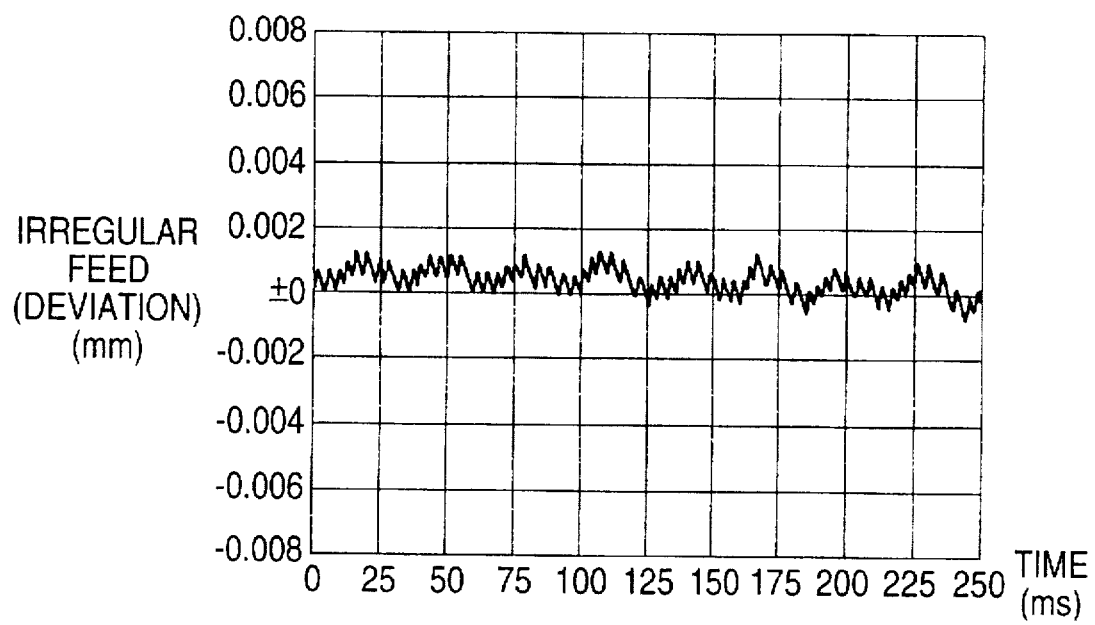
Figure 8:
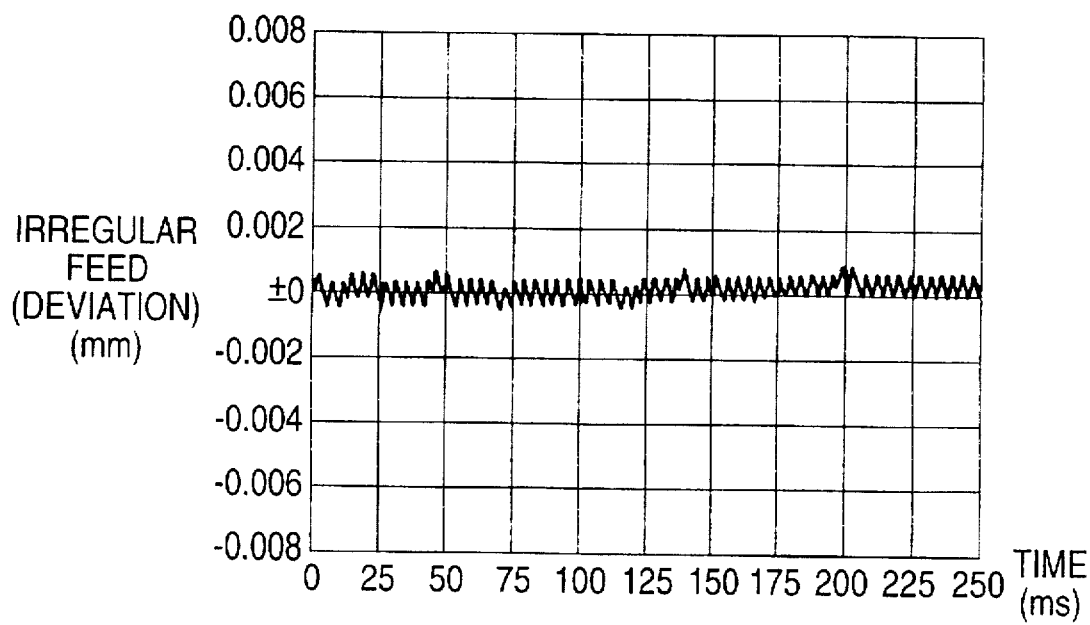
Figure 9:
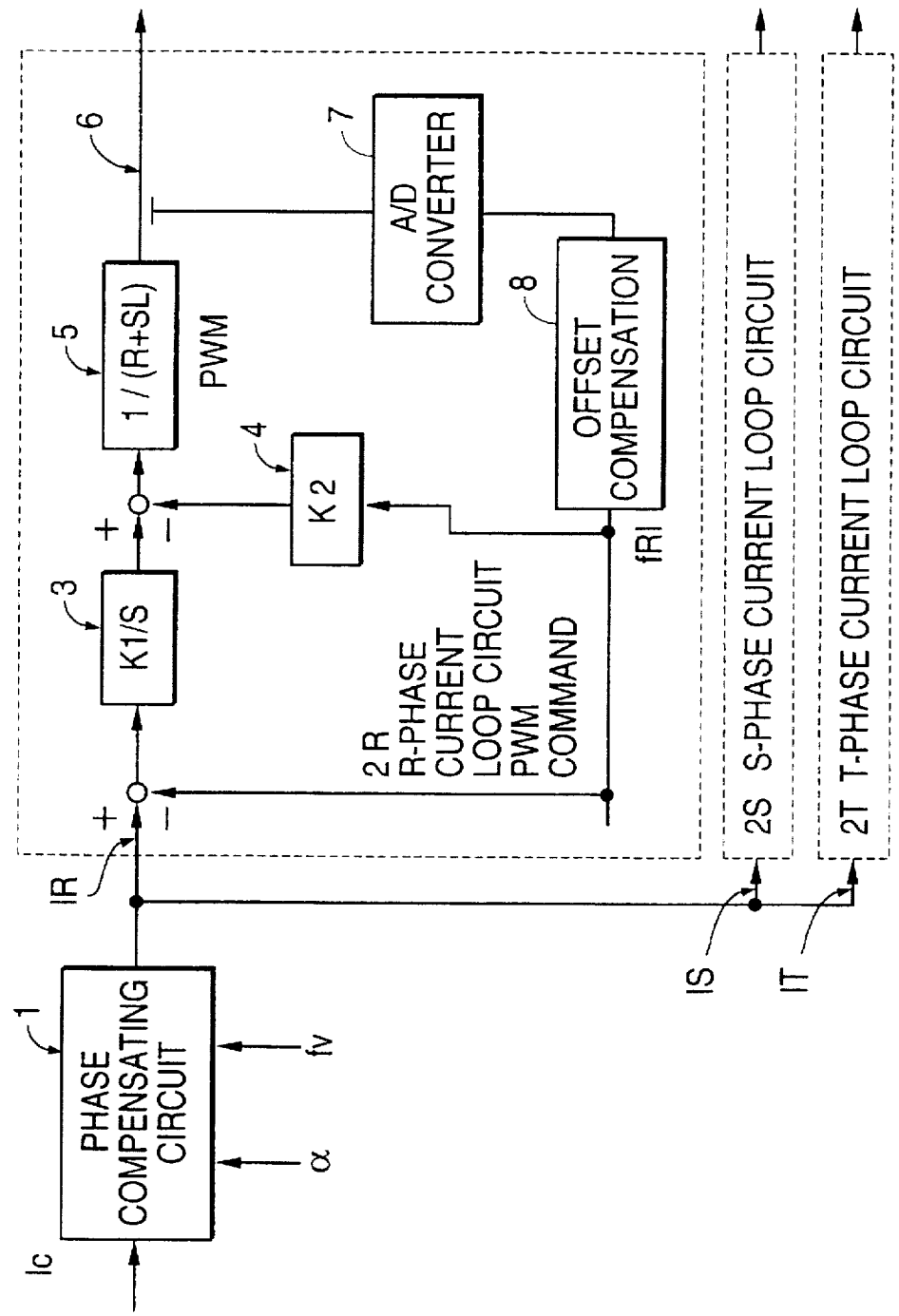
Figure 10:
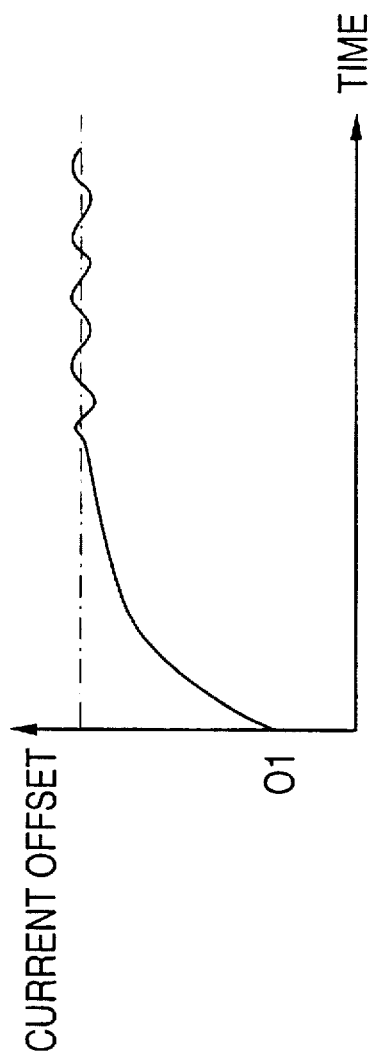

3 description of the preferred embodiments of the invention with reference to the accompanying drawings, in which:

FIG. 1 is a block diagram for explaining a method of AC servo motor control according to the present invention;

FIG. 2 is a block diagram showing a servo motor control system, to which the present invention is applied;

FIG. 3 is a block diagram for explaining a first embodiment of the present invention;

FIGS. 4A–4E are time charts of AC servo motor control according to the present invention;

FIG. 5 is a flow chart illustrating AC servo motor control according to the present invention;

FIG. 6 is a block diagram for explaining a second embodiment of the present invention;

FIG. 7 is a graph showing irregular feed generated in a conventional AC servo motor control;

FIG. 8 is a graph showing irregular feed generated in the AC servo motor control according to the present invention;

FIG. 9 is a block diagram showing a conventional current controller of a three-phase AC servo motor; and FIG. 10 is a graph showing a change of offset value with the passage of time.

DETAILED DESCRIPTION OF THE PREFERRED EMBODIMENTS

A method of AC servo motor control according to the present invention will now be described with reference to the block diagram of FIG. 1. Shown on the left side of a chain line in the Figure is NC (numerical control) side 10, and on the right side is motor side 20.

The NC side 10 comprises a current loop 11, a voltage command blocking unit 14, an A/D converter compensator 13, an offset compensating compensator 12, and a switching unit 31. The current loop 11 outputs a voltage command Vc to the motor side 20. The voltage command blocking unit 14 controls the connection between the current loop 11 and the motor side 20. The A/D converter 13 converts actual current If in the motor 21 into a digital signal. The offset compensator 12 receives the output (If+ΔI) of the A/D converter 13, subtracts an offset component (ΔI) from the received output, and delivers the resultant difference to the current loop. The switching means 31 outputs a calculation start signal for starting calculation of offset value to the voltage command blocking unit 14 and offset compensator 12.

The command to an AC servo motor actually takes the form of voltage command, and the voltage command is produced according to a deviation between the current command Ic and feedback value If (which has been compensated for offset).

A servo motor control system, to which the present invention is applied, is shown in the block diagram of FIG. 2. The servo motor control system is similar in structure to the conventional system for digital servo control. Therefore, only the outline of the servo motor control system is explained here. Referring to FIG. 2, reference numeral 15 is a computerized numerical controlled (CNC), reference numeral 16 a shared RAM, reference numeral 17 a digital servo circuit including a CPU (central processing unit), a ROM, a RAM or the like, reference numeral 22 a power amplifier such as a transistor inverter, reference numeral 21 an AC servo motor, and reference numeral 23 an encoder/rotor-position detector for generating pulses according to the revolution of the servo motor and detecting the rotor phase.

The CPU of the digital servo circuit 17 reads a position command or speed command given from the CNC 15

4 through the shared RAM 16 for position-loop processing or speed loop processing.

Now, a first embodiment of the present invention will be described with reference to FIG. 3.

Referring to FIG. 3, NC side 10 shown enclosed in a chain line rectangle has a structure corresponding to the digital servo circuit 17 shown in FIG. 2. Motor side 20 shown enclosed in a chain line rectangle has a structure corresponding to the motor 21 and power amplifier 22 shown in FIG. 2.

On the NC side 10, to a CPU 40 are connected through a bus 47 a counter value memory 41, a data integrated value memory 42, a current offset value memory 43, an offset data memory 44, an A/D converter 45 and an input/output unit 46. The A/D converter 45 converts offset data input from the motor side 20 into a digital signal, and the input/output unit 46 outputs a voltage command to the power amplifier 22 on the motor side 20. Among the various memories noted above, the counter value memory 41 counts detected offset data pieces n. The data integrated value memory 42 is provided for integrating the detected offset data value D. The current offset value memory 43 stores an offset value (i.e., quotient of division of the integrated value D by a predetermined number of integration times N) to be used for an offset compensation. The offset data memory 44 tentatively stores inputted offset data before the data is inputted to the data integrated value memory 42.

The motor side 20 comprises a current detector 24 for detecting actual motor current, an insulating amplifier 25 connecting the current detector 24 and connected to the A/D converter 45. The actual current detected by the current detector 24 is outputted as offset data to the NC side 40.

The operation of the first embodiment will now be described with reference to the time chart of FIG. 4 concerning AC servo motor control according to the present invention and the flow chart of FIG. 5 illustrating the AC servo motor control.

Referring to the time chart of FIG. 4A shows a clock signal C representing a current control cycle. FIG. 4B shows a switching signal P to be inputted for blocking the voltage command from being transferred to the motor side. FIG. 4C shows an offset data taking-in signal Q representing the taking-in state of the basic data for obtaining the offset value (such basic data is a current value detected and hereinafter referred to as offset data). FIG. 4D shows an integration level of the integrated value D of the offset data. FIG. 4E shows a time when an offset value ΔI is updated.

A process routine concerning the calculation of the offset value for updating will now be described with reference to the flow chart of FIG. 5.

Upon starting a power supply to the AC servo motor (Step S1), the count n of the counter value memory 41 is initialized to "0" (Step S2). The count n is a numerical value representing the number of detected offset data pieces, that is, the count n represents the number of times of offset data taking-in which is executed for every cycle of the clock signal C, while the offset data taking-in signal Q is "on".

Subsequently, driving of an apparatus using the AC servo motor is started, and then, the current command Ic is transmitted to the AC servo motor according to the driving of the apparatus. While the switching signal P is "1" (i.e., from time a to time d in (b) of FIG. 4), the current command Ic is outputted to the motor side. During this time, the driving of the AC servo motor is controlled under control of the current command Ic.

While the switching signal P is "1" so that the driving of the AC servo motor is controlled under control of the current command Ic (and hence voltage command), a noise component ΔI is fed back in superimposition on the actual current If. Therefore, it is impossible to take out the offset component ΔI alone. For this reason, during this time, the offset data is not taken in (that is, the offset value is not calculated). In other words, during this time, the offset data taking-in signal Q in FIG. 4C is "0". Thus, during this time, feedback current compensation (i.e., offset compensation) is made according to the previously set offset value for AC servo motor control.

At time a in FIG. 4B, the switching signal P is switched from "0" to "1" (Step S3). At this time, offset data taking-in, which is described later, is not in operation (Step S16). Thus, the routine goes back to the first step S1.

At subsequent time d in FIG. 4B, an motor suspending signal is inputted to the switching unit unit 31, and then, the switching unit 31 causes the voltage command blocking means 14 to de-energize the motor. That is, the motor is brought to a state where no current flows through the motor. At this time, the switching signal P is switched from "1" to "0" (Step S3).

After the switching signal P turned "0", the CPU takes in offset data (Steps S4 and S5). The taking-in of offset data is carried out with the rising of the clock signal C as checked for in Step S4 and the timing checked for in Step S5 in order that the taking-in of offset data can be made reliably. The CPU executes the taking-in of data and checking of change of the switching signal P in succession within one cycle time T, so that time redundancy is provided such that the taking-in of offset data is made in the cycle of clock signal C subsequent to the cycle in which the switching signal P is switched to "0".

Upon reaching the time for taking in the offset data in the cycle subsequent to the cycle in which the switching signal P has been switched to "0", the offset data taking-in signal Q is switched to "1" to start the taking-in of offset data (at time e in FIG. 4C).

At the start of the taking-in of offset data, a check is made as to whether or not the count n representing the number of offset data pieces detected first is "0" (Step S6). If the count n is "0", that means the integration of offset data has not yet been made, and thus, the offset data integrated value D is cleared (Step S7, at time f in FIG. 4D). In FIG. 4D, the zero level as the result of clearing is shown by a chain line. If the count n is not "0", that means the integration of offset data has already been made. In this case, the integration of offset data and the calculation of offset value are executed in Step S8 and following steps.

After the offset data integrated value D has been cleared in Step S7, the routine goes back to Step S3 for the integration of offset data.

If the switching signal P is "0", the clock signal C has already risen, data taking-in time has been reached and further n is not zero (n≠0), then processing of offset data integration is executed (Steps S8 to S11).

In the first place, the taking-in of data is started (Step S8). This taking-in of data will be described with reference to FIG. 3. The CPU 40 once stores the digital signal, which has been obtained as a result of conversion of the offset data in the A/D converter 45, in the offset data memory 44. The digital signal is tentatively stored in the offset data memory 44 in order to permit processing in synchronism with the cycle of the clock signal C.

The read offset data is added to the integrated data D that has already been accumulated in the data integrated value memory 42 in FIG. 3 to update a value of the integrated data D to be accumulated in the data integrated value memory 42 (Step S9). Then, the count in the counter value memory 41 is incremented by "1" (Step S10). When offset data is taken in for the first time (time g in FIG. 4D), the value of the offset data is stored as a data integrated value D in the data integrated value memory 42.

Subsequently, the count n is compared with the predetermined number N (Step S11). The predetermined number N represents the number of times of taking-in of offset data, and a current offset value is calculated from the offset data taken in N times. By detecting offset data N times and deriving the current offset value from these detected data, it is possible to reduce error due to fluctuations of offset data. FIG. 10 shows the change of offset data with the passage of time. After a start of power supply to the motor, the offset data is changed with increased of temperature to approach a constant value. However, the offset data does actually not become the constant value but is fluctuated repeatedly. According to the present invention, the offset data are read repeatedly, and the current offset value is determined from these data detected several times. The predetermined number N determines the number of offset data pieces to be read.

If it is found in the judgment of Step S11 that the count n is smaller than the predetermined number N (n<N), the routine goes back to Step S3 for reading of the predetermined number N of offset data pieces and integration of the read offset data. In this case, the count n is "1" or more, and thus, as a result of the judgment in Step S6, the routine goes to Step S8. For every cycle of the clock signal C, the integrated value of offset data is added to the data integrated value memory 42 (times, g, h, ... in FIG. 4D).

When the number n of times of reading of offset data and integration thereof becomes equal to the predetermined number N, the condition of n≧N is satisfied in the judgment of Step S11, thus bringing an end to the taking-in of offset data. The time interval corresponding to the predetermined number N is shown by T×N in FIGS. 4A–E(T: processing cycle time of the CPU).

When the count n reaches the predetermined number N, the offset data taking-in signal Q in FIG. 4C falls to the low level (at time i in FIG. 4C). The CPU 40 is thus caused to read out the offset data integrated value D accumulated in the data integrated value memory 42 (at time j in FIG. 4D), divide the offset data integrated value D by the predetermined number N (Step S13) and stores the result as a new offset value in the current offset value memory 43 (Step S14) to update the previous offset value (Step S15, time k in FIG. 14E). Subsequently, the new offset value is used to correct the current feedback for controlling the AC servo motor.

After updating the offset value in Step S15, the routine goes back again to Step S1 to repeat the process as described. Since the count n is cleared in Step S2 after updating the offset value, the offset data integrated value D is also cleared in Step S7. Thus the second rising of the offset data taking-in signal Q (at time 1 in FIG. 4C) is brought about in the "0" state of the offset data integrated value D (time m in FIG. 4D).

Afterwards, the current offset data integrated value D is obtained in the manner as described, and then, the current offset value ΔI is updated (at time p in FIG. 4E).

As shown in FIG. 4D, in the first integration process (1) from time f to time j and also in the subsequent second integration process (2) from time m to instant o, the integration is made N times. In the third integration process (3) from time r, however, the switching signal P is switched to "1" while N times of integrations have not yet been finished.

In such third integration process (3), the offset value is not updated by using the integrated value accumulated so far in the data integrated value memory 42. In other words, since it is found in Step S11 that n<N, the routine goes back to Step S3. At this time, the value of the switching signal P is 1 (P=1), and the offset data is being taken in (Step S16). Thus, the taking-in of data is interrupted (Step S17), and the routine goes back to the first Step S1.

As shown above, in the above first embodiment, the calculation of the offset value ΔI for updating and offset compensation according to the new offset value ΔI are all executed in software.

Now, a second embodiment of the present invention will be described with reference to the block diagram of FIG. 6. This embodiment is featured in that the AC servo motor is controlled with hardware. Like the first embodiment, in this embodiment, the calculation of current offset value for updating may be made according to the time charts of FIGS. 4A–4E.

Referring to FIG. 6, offset data is converted in an A/D converter 61 into a digital signal, which is outputted through a gate 62 to an adder 63 for integration. The integrated value of offset data obtained in the adder 63 is divided in a divider 64 by a predetermined number N, and the result is stored in a memory 65 to be provided as a current offset value ΔI. Further, a switching signal P which is obtained from an emergency stop signal or the like is outputted through a NOT circuit 52 to one input terminal of an AND circuit 53. To the other input terminal of the AND circuit 53, a clock signal C is inputted from a clock circuit 51.

The output of the AND circuit 53 is outputted to and held in a flip-flop 54. The switching signal P is further supplied to the flip-flop 54 to be outputted as one output thereof, and rising of the switching signal P makes gate 62 to open, whereupon data in the A/D converter 61 is outputted to the adder 63. The other output of the flip-flop 54 causes up-counting of a counter 55. The count n in the counter 55 is compared in a comparator 56 with the predetermined number N. When the count n and number N become equal to each other, calculation in the divider 64 is conducted. Then the value is stored in the memory 65 and the adder 63 and counter 55 are reset.

The flip-flop 54 is reset by the rising of the switching signal P.

In the processing in the hardware shown in FIG. 6, upon falling of the switching signal P due to a motor suspending signal or the like, the offset data, which represents the actual motor current, is outputted to the adder 63 through the gate 62, which opens with the clock signal C generated after the falling of the switching signal P. The adder 63 accumulates the offset data and holds the accumulated value as an integrated value.

When the count n of the counter 55 reaches the predetermined number N, the value held in the adder is divided by the predetermined number N to obtain the mean value of offset data. This mean offset data value is stored as the current offset value ΔI in the memory 65 to be used for the offset compensation.

FIG. 7 shows irregular feed in a conventional AC servo motor control method. FIG. 8 shows irregular feed in the AC servo motor control according to the present invention. The curves shown in FIGS. 7 and 8 are the results of measurement obtained after some time has passed since a start of the power supply to the motor. In the Figure, time 0 corresponds to start of measurement. In FIG. 7, current feedback is corrected using the current offset value obtained on the basis of offset data at the time of the start of the power supply to the motor. Therefore, the current feedback compensation may become insufficient due to hardware characteristic variations caused by increase of motor temperature, thus giving rise to irregular feed corresponding to the pole number of the AC servo motor.

In FIG. 8, which shows the AC servo motor control according to the present invention, motor suspending is carried out in the state where the temperature of the AC servo motor has been increased, and while operation of the motor is suspended, the offset compensation is conducted by updating of the current offset value, thereby making it possible to reduce the irregular feed.

What is claimed is:

1. An apparatus for AC servo motor control in which an actual motor current is used as a feedback current, comprising:

a current control loop receiving a current command and a compensated current to produce and output a voltage command based on a deviation between the received current command and the compensated current;

voltage command blocking means, provided between the current loop and an AC servo motor, which upon reception of a blocking signal, inhibits the transfer of the voltage command to the AC servo motor;

switching means for sending out the blocking signal to said voltage command blocking means;

offset calculation means for calculating an average deviation in the feedback current over a predetermined period of time, while the switching means sends out the blocking signal;

offset storage means for storing the average deviation in the feedback current; and offset compensation means for producing the compensated current by removing from the feedback current the average deviation in the feedback current as stored in the offset storage means, and delivering the compensated current to said current control loop.

2. An apparatus for AC servo motor control according to claim 1, further comprising an inhibiting means for inhibiting the operation of said offset calculation means when the switching means does not send out the blocking signal.

3. An apparatus for AC servo motor control according to claim 1, wherein the offset calculation means calculates the average deviation in the feedback current by sampling the deviation periodically for a predetermined number of times, summing the samplings and dividing the sum of the samplings by the predetermined number.

4. An apparatus for AC servo motor control according to claim 3, further comprising inhibiting means for inhibiting the offset calculation means when the switching means sends out the blocking signal such that if the average deviation has been sampled less than the predetermined number of times when the switching means sends out the blocking signal, the offset storage means is not updated.

5. A method of AC servo motor control in which an actual motor current is used as a feedback current, comprising the steps of:

(a) finding an average deviation in the feedback current from a zero command value, over a predetermined period of time, whenever a blocking signal is produced;

(b) storing the average deviation in the feedback current;

(c) producing a compensated current by removing from the feedback current the stored average deviation in the feedback current, when the blocking signal is interrupted;

(d) driving the AC servo motor based on a difference between a current command and the compensated current; and (e) repeatedly performing steps (a) through (d).

6. A method of AC servo motor control according to claim 5, wherein the average deviation in the feedback current is found by sampling the deviation periodically for a predetermined number of times, summing the samplings and dividing the sum of the samplings by the predetermined number.

7. A method of AC servo motor control according to claim 5, wherein the AC servo motor is driven with a voltage command, the voltage command based on the difference between the current command and the compensated current.

8. A method of AC servo motor control according to claim 7, wherein when the blocking signal is produced, power supplied to the AC servo motor is blocked.

* * * * *